(12) United States Patent
Meyer et al.

(10) Patent No.: US 11,941,922 B2
(45) Date of Patent: Mar. 26, 2024

(54) COMPONENT BASED AUTOMATED IDENTIFICATION OF A CONFIGURABLE VEHICLE

(71) Applicant: SRAM, LLC, Chicago, IL (US)

(72) Inventors: James Meyer, Spearfish, SD (US);
Alan Christianson, Spearfish, SD (US);
Alan Fischer, Spearfish, SD (US);
Andrew Fischer, Hopkins, MN (US);
Ben Jasinski, Spearfish, SD (US);
Kevin Duellman, Glenview, IL (US)

(73) Assignee: SRAM, LLC, Chicago, IL (US)

( * ) Notice: Subject to any disclaimer, the term of this patent is extended or adjusted under 35 U.S.C. 154(b) by 379 days.

(21) Appl. No.: 16/780,764

(22) Filed: Feb. 3, 2020

(65) Prior Publication Data

US 2020/0250246 A1     Aug. 6, 2020

Related U.S. Application Data

(60) Provisional application No. 62/801,645, filed on Feb. 5, 2019.

(51) Int. Cl.
*G07C 5/00*     (2006.01)
*B62J 45/20*    (2020.01)
(Continued)

(52) U.S. Cl.
CPC .............. *G07C 5/008* (2013.01); *B62J 45/20* (2020.02); *G06F 16/953* (2019.01);
(Continued)

(58) Field of Classification Search
CPC .... G07C 5/008; G07C 5/0808; G07C 5/0841; H04W 4/44; H04W 4/40; G06F 16/953; B62J 45/20
See application file for complete search history.

(56) References Cited

U.S. PATENT DOCUMENTS 8,705,527 B1    4/2014  Addepalli et al.
9,218,626 B1 *  12/2015 Haller, Jr. .......... G06Q 10/0875
(Continued)

FOREIGN PATENT DOCUMENTS

CN     107195015 A    9/2017
CN     107680198 A    2/2018
(Continued)

*Primary Examiner* — Mohamed Barakat
*Assistant Examiner* — Rufus C Point

(57) ABSTRACT

The disclosed embodiments relate to a computer-based system and/or method which automatically, e.g. with minimal, or entirely without, human intervention, identifies, distinguishes, disambiguates or otherwise differentiates among multiple configurable bicycles based on the data reported to the system from the bicycle's data-reporting components, such that the data reported by those components may be associated with a particular bicycle for real-time and/or later review, analysis, etc. More particularly, where one or more data reporting components of a bicycle may change, the disclosed embodiments enable a data gathering system/service to identify, distinguish, disambiguate or otherwise differentiate among multiple bicycles which may use, or have used, one or more of the same components so as to associate the reported data, such as from a particular ride, with the correct bicycle configuration for real-time and/or later review and/or analysis.

18 Claims, 8 Drawing Sheets

(51) Int. Cl.
*G06F 16/953* (2019.01)
*G07C 5/08* (2006.01)
*H04W 4/40* (2018.01)
*H04W 4/44* (2018.01)

(52) U.S. Cl.
CPC ......... *G07C 5/0808* (2013.01); *G07C 5/0841* (2013.01); *H04W 4/40* (2018.02); *H04W 4/44* (2018.02)

(56) References Cited

U.S. PATENT DOCUMENTS

| | | | | |
|---|---|---|---|---|
| 2003/0028297 A1* | 2/2003 | Iihoshi | ................... | G07C 5/008 701/29.6 |
| 2005/0065779 A1* | 3/2005 | Odinak | ................... | G10L 15/30 704/E15.047 |
| 2005/0197063 A1* | 9/2005 | White | ............... | H04M 1/72448 482/1 |
| 2006/0114531 A1* | 6/2006 | Webb | ................. | G01N 21/8851 359/15 |
| 2008/0001771 A1* | 1/2008 | Faoro | ....................... | G08G 1/20 235/382 |
| 2009/0181826 A1 | 7/2009 | Turner | | |
| 2010/0315204 A1* | 12/2010 | Kamel | ..................... | B61K 9/04 340/10.51 |
| 2013/0198088 A1* | 8/2013 | Mewes | ................... | G06F 30/20 705/305 |
| 2014/0164579 A1* | 6/2014 | Douthitt | ................ | G07C 5/008 709/219 |
| 2015/0006043 A1* | 1/2015 | Miglioranza | .......... | B62M 9/132 701/51 |
| 2015/0105972 A1* | 4/2015 | Madison | ............... | G07C 5/0808 701/33.2 |
| 2016/0049017 A1* | 2/2016 | Busse | .................... | G07C 5/008 701/33.3 |
| 2017/0012455 A1 | 1/2017 | Kato et al. | | |
| 2017/0090458 A1* | 3/2017 | Lim | ................... | G05B 23/0232 |
| 2017/0109373 A1* | 4/2017 | Sung | ....................... | H04L 69/22 |
| 2017/0270719 A1* | 9/2017 | Wegerle | .................. | G07C 5/08 |
| 2017/0294054 A1 | 10/2017 | Rosenbaum | | |
| 2018/0013833 A1 | 1/2018 | Wolf, V | | |
| 2018/0351557 A1* | 12/2018 | Jim | ....................... | G06M 30/327 |
| 2019/0315432 A1* | 10/2019 | Böckmann | ............... | B62J 43/20 |
| 2020/0364953 A1* | 11/2020 | Simoudis | ............. | B60W 60/001 |

FOREIGN PATENT DOCUMENTS

| | | |
|---|---|---|
| CN | 108597216 A1 | 9/2018 |
| DE | 19931769 A1 | 1/2001 |
| DE | 102016005998 A1 | 1/2017 |
| EP | 3392128 A1 | 10/2018 |
| TW | 201516932 A | 5/2015 |
| WO | 2019011197 A1 | 1/2019 |

\* cited by examiner

COMPONENT BASED AUTOMATED IDENTIFICATION OF A CONFIGURABLE VEHICLE

RELATED APPLICATIONS

This application claims the benefit of the filing date under 35 U.S.C. § 119(e) of U.S. Provisional Application Ser. No. 62/801,645, filed Feb. 5, 2019, the entirety of which is incorporated by reference herein and relied upon.

BACKGROUND

Human powered vehicles, such as bicycles, have numerous components, such as a frame, handlebars, wheels, tires, brakes, including brake calibers and brake actuators, pedals, gears, gear actuating/selection mechanisms, seats, seat posts, etc. Recent advances in bicycles have seen the further addition of optional electric motor based assist systems which add an electric motor, battery, control mechanisms, etc.

Prior bicycles were configured by the manufacturer and sold to the consumer as a complete configuration, referred to as a "bicycle configuration." However, as users, such as professional, semi-professional, amateur, and pro-sumer users, etc. have sought increased performance, customization and/or optimization from their bicycles, a market for semi- and fully customizable bicycle configurations, after-market components, etc. has developed to cater to the rider who wishes to improve, customize or otherwise optimize their bicycle.

Riders may now specify one or more custom components when they purchase their bicycles, buy and assemble a custom configuration of components and/or otherwise replace, swap or upgrade one or more components.

Furthermore, recent advances in bicycle and component design have yielded electrically actuated mechanisms, as opposed to mechanically, e.g. using a connecting actuating cable, such as gear selection mechanisms (derailleurs), seat height adjustment mechanisms and adjustable shock absorbers. These mechanisms may be wired or wireless. In addition to providing functionality to control/operate/adjust the bicycle's operation, many of the bicycle control devices feature the capability to sense and report data regarding the operation of the device, e.g. to report battery condition, performance data, current operating state, faults, etc.

Wired and/or wireless sensing devices have also been developed for use on bicycles such as tire pressure monitors, shock absorber monitors, performance measuring devices, GPS locating devices, etc.

Typically, data from such control or sensing devices is reported to, or otherwise collected by, a bicycle computer, also referred to as a head unit, which is a specialized, and typically lightweight frame or handlebar mounted, mobile computing device specifically programmed to provide bicycle related functions and which is coupled with, either via wired or wireless connections, the various suitably enabled components of the bicycle.

Having all of this data available has prompted the development of software tools to collect and analyze the data, derive conclusions therefrom, provide recommendations, etc.

Where a cyclist owns a single bicycle, collecting, collating, and/or analyzing the data reported by the various components thereof, whether or not components are swapped or changed out for other components, during use of the bicycle may not be a difficult task.

However, it is not uncommon for a bicycle enthusiast to own multiple bicycles and swap components among those bicycles in an effort to find an optimum configuration or otherwise merely try out different component combinations. Or they may own only one of a particular component and wish to move it to the bike they currently want to ride.

In this case, associating data reported by the various components with a particular bicycle for collection, collating and/or analysis becomes more challenging to ensure that the data from the configuration of devices is accurately associated together in a manner which reflects the actual usage. In particular, as it will be appreciated from the above description that configuring the actual bicycle, as well as riding it, is challenging enough, it is desirable to make the process of gathering and analyzing data from the bicycle as convenient as possible.

BRIEF DESCRIPTION OF THE DRAWINGS

FIG. 6 depicts a block diagram of

DETAILED DESCRIPTION

Figure 1:
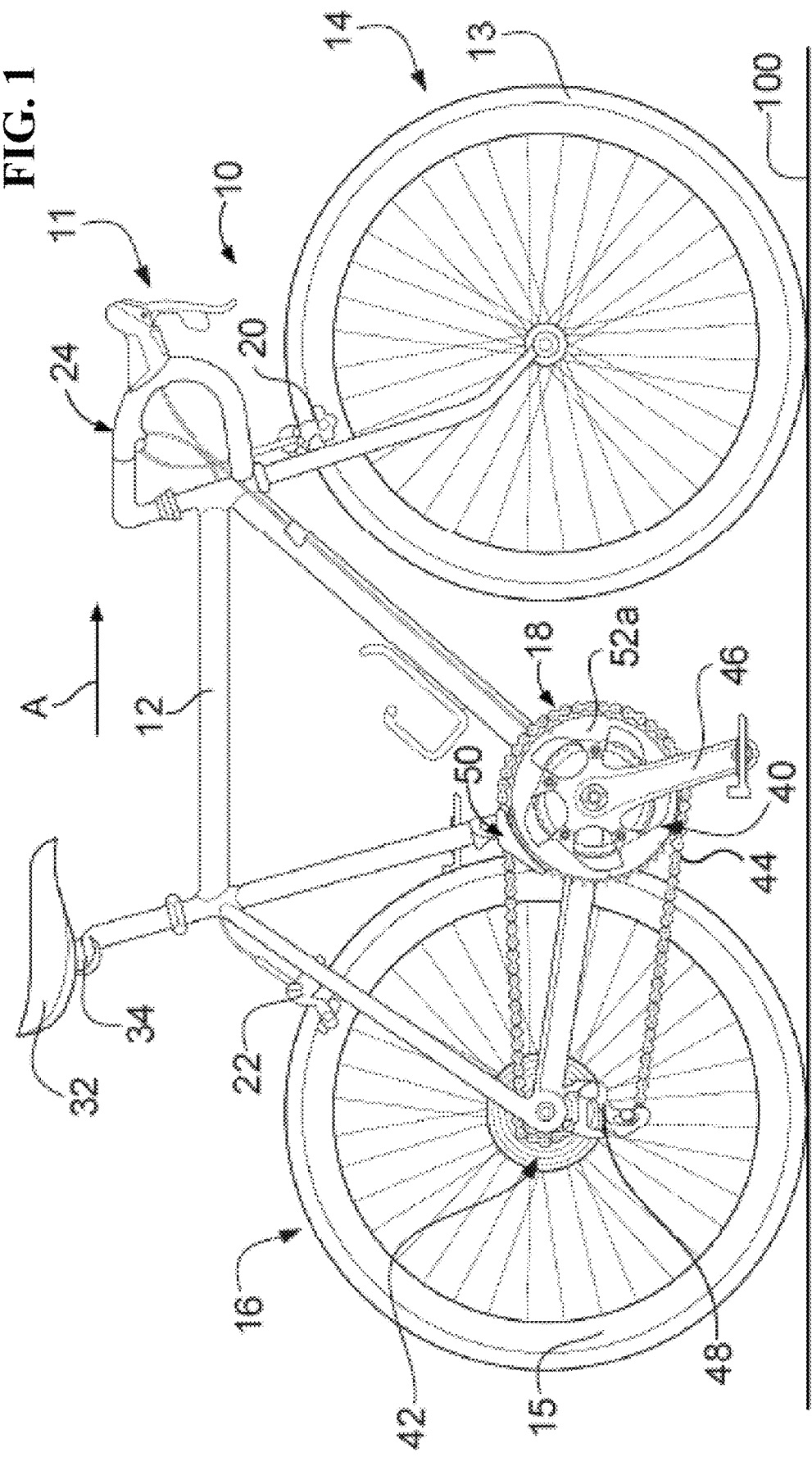
FIG. 1 depicts an example bicycle for use with the disclosed embodiments.

The disclosed embodiments generally relate to a computer-based system and/or method which automatically, e.g. with minimal, or entirely without, human intervention, identifies, distinguishes, disambiguates or otherwise differentiates among multiple configurable bicycles based on the data reported to the system from the bicycle's data-reporting components, such that the data reported by those components may be associated with a particular bicycle for real-time and/or later review, analysis, etc. More particularly, where one or more data reporting components of a bicycle may change, the disclosed embodiments enable a data gathering system/service to identify, distinguish, disambiguate or otherwise differentiate among multiple bicycles which may use, or have used, one or more of the same components so as to associate the reported data, such as from a particular ride, with the correct bicycle configuration for real-time and/or later review and/or analysis.

The disclosed embodiments may be used and/or implemented by a remote, e.g. cloud-based, system/service which remotely, e.g. via a wired and/or wireless network, collects data from multiple bicycles and provides data review, reporting and/or analytical services to riders and/or owners thereof. As will be described, the combination of the bicycles, the remote system and the interconnecting infrastructure therebetween may be referred to as a "bicycle system," such as the bicycle system 120 described below with respect to FIG. 3. Alternatively, the term "bicycle system" may refer only to the remote/cloud service.

The disclosed embodiments implement a practical application for enabling a remote service to identify, distinguish, disambiguate or otherwise differentiate among multiple configurable bicycles which may share a subset of component devices based on the data reported to the system from the bicycle's data-reporting components, allowing the remote system to accurately associate the reported data with the appropriate bicycle for reporting, review and analysis. The disclosed embodiments solve a technical problem of remote systems being able to disambiguate data being communicated thereto from multiple devices.

As used herein, a user configurable, or otherwise customizable, vehicle is one where one or more of the component devices which form the user configurable vehicle may be replaced with another one or more component devices which perform a similar function by a user of the user configurable vehicle contemporaneously with, or subsequent to, manufacture thereof, or where a new/additional component device is added to perform a new, supplemental or assistive function. In one embodiment, replacement of a component device may include, for software configurable/defined component devices, alteration of one or more of the operational parameters via programmable settings, or programming code, e.g., as opposed to replacement of the actual physical device, to alter, for example, timing, limits, resistance, responsiveness, tuning, stiffness, travel distance, saved profiles, etc. In one embodiment, the user configurable vehicle is a bicycle, such as the bicycle 10 described below with respect to FIGS. 1 and 2.

The user configurable vehicle may be operated via human power at least during some of its operation or via a combination of human and motorized power (assist) (which includes operating with no human and/or no motorized power), such as where the motorized power provides that operating power which is not provided by human power (supplemental/assist). Accordingly, the component devices may include those components necessary to provide motorized power, e.g. one or motors, batteries and/or controllers.

For example, the component devices may include the frame, or separate components thereof, wheels, tires, seat post, seat post actuator, seat, brake actuators, brake controls, suspension components, shock absorbers, transmission (gears), transmission actuators (derailleur), transmission actuator controls, handlebars, pedals, cranks, tire pressure monitors, lights, electric motor, electric motor controls, power meter, tire pressure sensor, head unit, etc. A component device may be designed to perform the functions of multiple other component devices and multiple component devices may be used to perform the function of a single component device, e.g. where a single piece frame may be replaced with a combination of frame and suspension component devices. It will be appreciated that there may other component devices, now available or later developed, which may be utilized with the disclosed embodiments as described.

The component devices may comprise data reporting component devices and non-data reporting component devices. Non-data reporting component devices may include component devices which do not generate data, e.g. devices whose function is performed merely by their presence, such as structural components like the bicycle frame, handle bars, or seat. Data reporting devices may include or be associated with a sensor (a device which detects, measures or derives a physical property and records, indicates, or otherwise responds to it) and/or actuator which performs a function and which at least generates, continuously, periodically or responsive to an event, data indicative of an operational or environmental state of the component, a response to a command, or a condition or physical characteristic sensed thereby, etc. The data received from a particular device over a period of time, such as a session or ride, may be referred to as a "device data stream." It will be appreciated that non-data reporting devices may be associated, or otherwise supplemented, with a data reporting device so as to report data regarding the non-data reporting device. For example, a sensor may be affixed to a frame to detect and report stress and/or deformations therein, or to handlebars to detect position/orientation. The disclosed embodiments may be operable with any such data reporting component devices now available or later developed.

Data reporting devices comprising sensors may sense, for example, the magnitude and/or rate of change of air pressure, air temperature, humidity, precipitation, altitude, wind speed, ambient light, road surface temperature, tire temperature and/or pressure, shock absorber activity or characteristics, road surface type, road surface coefficient of friction, angle of ascent, angle descent, pitch, roll, yaw, velocity, acceleration, wheel rotation, wheel slip, wheel cant, wheel camber, cadence, power (e.g. crank power), force (e.g. braking force), torque, battery level, battery charge/discharge rate, battery remaining time to depletion, GPS position, compass heading, fluid level, fluid viscosity, wear of a consumable/sacrificial component (e.g. brake or tire wear).

Data reporting component devices comprising actuating devices, alone or in combination with a sensor device, may include brake actuators, transmission actuators (derailleurs), electric motors, etc. Such devices may further track and report battery status and/or maintenance requirements, e.g. based on maintenance (time based) intervals, actual wear or detected faults. It will be appreciated that the disclosed embodiments may be used with other actuating device, now or later developed, such as devices which may alter frame stiffness, action or geometry, steering assist, braking assist, seat angle, etc.

Data reporting component devices may further report data comprising a device identifier and/or configuration data, e.g. device identifier, such as a serial number, operational/programmable parameters/settings, pairing configuration, etc.

Some data reporting component devices may report battery status only, such as brake actuators or gear/derailleur actuators (the derailleurs and/or gears themselves may report position or setting or current state (in set position, moving to set position)) and in some cases, only when the battery is nearing depletion. Some data reporting component devices may report data in response to receipt of a signal or command, such as in response to polling by a gateway device or activation of a pairing function.

Data reporting component devices may communicate their identifying, generated and/or operational data to a gateway device located proximate thereto, e.g. a bicycle head unit or other mobile device, via a wired and/or wireless network, e.g., a personal area network (bus or point to point), described below, such as via Bluetooth, Zigbee, Wifi, near field communication or other wired and/or wireless proprietary and/or non-proprietary local area communication protocol. While the disclosed embodiments will be described with respect to the use of a gateway device which collects and relays data from the data reporting component devices to the described cloud based service via a wired and/or wireless wide area network, it will be appreciated that the disclosed embodiments may also be used with data reporting component devices, now available or later developed, which are enabled to directly communicate with the cloud based service via the wide area network, e.g. which may include their own LTE or 5G modem.

Figure 4:
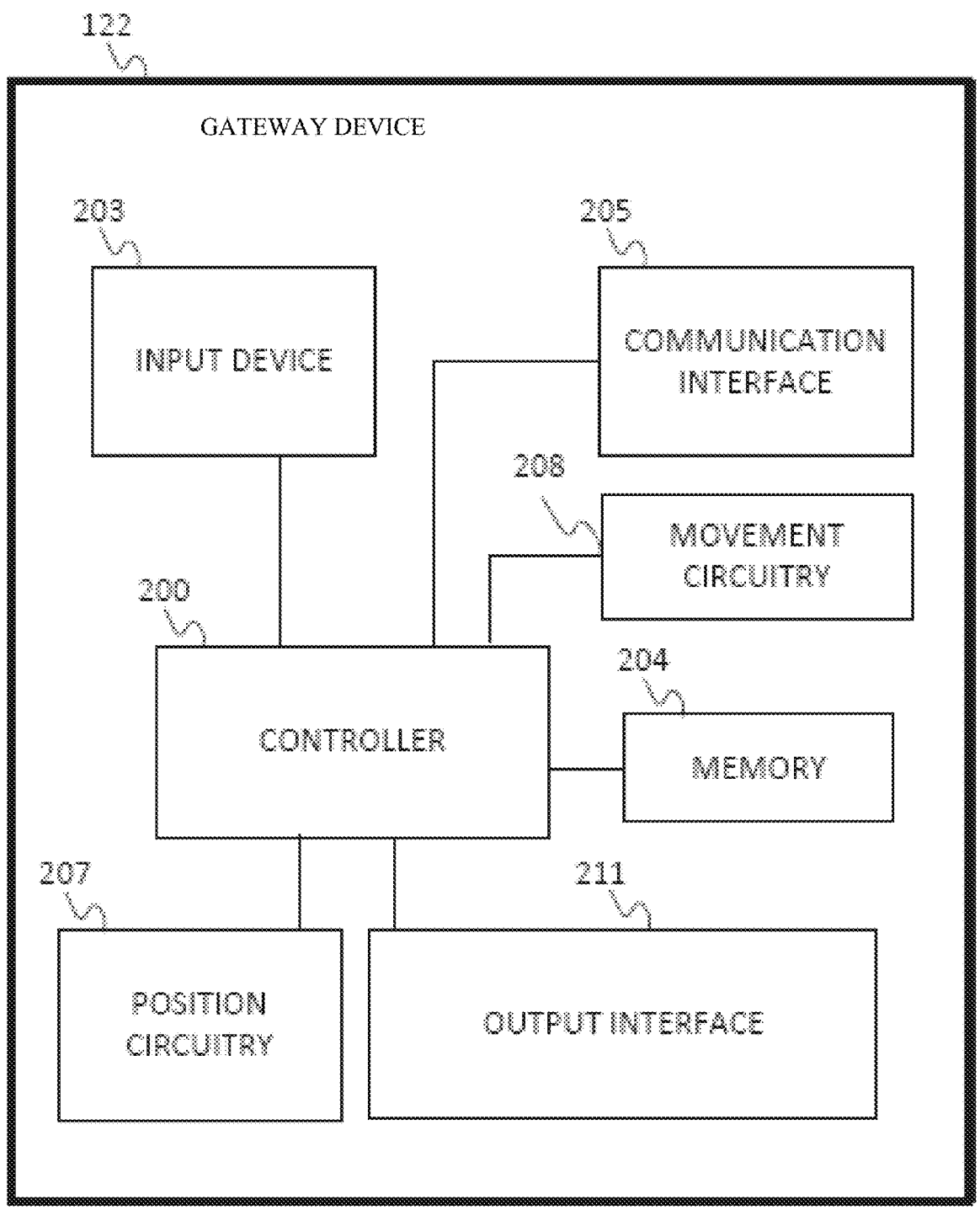
FIG. 4 depicts a block diagram of an example gateway device for use with the disclosed embodiments.

A gateway device, such as the gateway device described below with respect to FIG. 4, is a device operative to collect data from the set of data reporting component devices via the network and forward or relay the collected data to the cloud based service as described herein. The gateway device may be a head unit, bicycle computer, mobile device (smartphone) or other device, or combination thereof, which is capable of interfacing with the data reporting component devices, e.g. between the network to which those component devices are coupled and the network, e.g., wide area network, or another device coupled therewith, to which the cloud based service is coupled. For example, the gateway device may further utilize another mobile device, e.g., a smart phone, for network connectivity with the wide area network, e.g. using Bluetooth tethering, WiFi, etc. In one embodiment, a gateway device may implement or act as a proxy server and/or firewall to relay communications from data reporting component devices on behalf thereof and prevent direct communications with the data reporting component devices via the wide area network. In an embodiment, a component device may be the gateway device. For example, a transmission actuator, such as a derailleur, may act to aggregate data from other component devices of the bicycle, and thus the component device may be an aggregating component device to be the gateway device. In such an embodiment, the component device may be configured for direct network access, or may be configured to communicate data with a mobile device, such as an external computer configured as a bicycle head unit or other device. The external computer may be configured for network connectivity, and may use the communicated aggregated data locally, and/or may communicate the aggregated data via the network.

Data reporting devices may push data, i.e. without first receiving a request therefore, to the gateway device or provide data to the gateway device responsive to a request therefrom, e.g. pull or polling. The gateway device may relay data to the cloud based service as it is received and/or accumulate data until occurrence of an event, such as expiration of a timer, establishment or reestablishment of a communication session with the wide area network and/or cloud based service, etc., and the transmit some or all of the accumulated data.

In one embodiment, the gateway device and/or data reporting component devices are configured to communicate with one another prior to operation, such as upon initial or subsequent power-on, wake from sleep/idle, etc. For example, each data reporting component device may be registered, e.g. paired, with the gateway device such that the gateway device stores a unique identifier, radio frequency, channel, etc. for each data reporting component device which may be used to facilitate communications therewith. A pairing process, whereby a component device must be specifically placed in a pairing mode, may be used to ensure that only particular component devices may communicate with a particular gateway device subsequently allowing the gateway device to discriminate among other data reporting component devices which may be nearby but not part of the particular vehicle, e.g. other wireless devices affixed to other bicycles which may be within wireless communication range of the gateway device, such as other bicycles located in a bicycle shop, other bicycles being ridden nearby, e.g. in a pack, etc. The pairing process may also enable secure communication to prevent another gateway device from accessing data from, or otherwise controlling a component device of, another vehicle. Alternatively, or in addition thereto, a polling/inventory process may be utilized whereby a gateway device sends a polling request to all nearby, or all previously paired, component devices which responsively provide identifying data back to the gateway device which then registers all responses. Such a process may be iterative or otherwise used in conjunction with a process by which the gateway device may discriminate against component devices which are within wireless communication range, and therefore respond to the polling request, but are not part of the configurable vehicle. For example, as the bicycle begins to be used, the gateway device may discriminate between those component devices demonstrating contemporaneous activity from other initially registered components which may not be reporting or otherwise reporting an idle state. In one embodiment, a gateway device may determine when data reporting component devices are added, removed or moved to another bicycle, such as a nearby bicycle, such as based on the component device being reset or the timing of the receipt of data signals therefrom changing, e.g. indicative of the component device being positioned at a distance from the gateway device different than it was previously.

The gateway device may store the registered component devices in a non-volatile or persistent memory so as to "remember" which component devices are affixed to the vehicle to avoid having to unnecessarily repeat the registration process and/or detect when registered devices fail to report data, such as due to a dead battery, interference or other fault.

In one embodiment, the inventory of data reporting component devices may be communicated to the remote/cloud service as will be described.

Data reporting component devices may be further characterized as static or dynamic where a static data reporting component device is one less likely to be moved from one configurable vehicle to another, e.g. from one bicycle frame to another, such as a derailleur, gear pack, cranks, rear wheel, etc. Dynamic data reporting components, in contrast, are those components more likely to be moved from one configurable vehicle to another, such as a tire pressure monitor, a shock absorber performance monitor, seat and/or seat post, front wheel, battery, etc. Whether a data reporting component is considered static or dynamic may be based on the actual or perceived ease, as, for example, assessed by the cloud service, with which the component may be removed from one vehicle and affixed to another, the cost of the component, e.g. where a user is less likely to own more than one of an expensive component, the design of the component as being easy or difficult to move, e.g. a component featuring a quick-release attachment mechanism, etc., and may be implementation dependent. It will be appreciated that component devices may be classified according to a different classification scheme or, alternatively, be characterized by a weighting value, where the existence one or more higher weighted component devices may be indicative of a particular bicycle, etc. For example, some component devices may be classified as master devices which must exist in only one configured bicycle. Alternatively, each different component type may be assigned a weighting value, such as based on the likelihood of the device being moved between bicycles. During the matching process, the weighting values of the subset of component devices determined to match a known configuration may be summed and compared against a threshold value to determine whether they match or not.

As used herein, a vehicle operating session, e.g. a ride, is a continuous or discontinuous period of time over which the vehicle is being utilized and where one or more of the data reporting component devices of a particular vehicle configuration may be reporting data and for which it may be desirable to record, e.g. for real time and/or subsequent review or analysis, the data generated by the data reporting component devices in association therewith and in further association with the particular vehicle configuration. An operating session may be temporally and/or event defined, e.g. by threshold idle periods of no data reporting bounding an active period of data reporting and/or an explicit event (on/off).

As will be further described herein, a user configurable/customizable vehicle may be defined by at least a subset and/or configuration of the data reporting component devices affixed thereto or utilized therewith. Where a user owns or operates multiple configurable vehicles and may move one or more data reporting component devices there between, the disclosed embodiments operate to uniquely identify the configurable vehicle so as to associate therewith the operational data reported by the data reporting configurable component devices. Accordingly a particular configurable vehicle may be defined, and therefore identified, by a threshold subset of data reporting component devices, such as only the static data reporting component devices.

In one embodiment, the configurable vehicle is a bicycle which includes a frame to which various component devices, data reporting and non-data reporting, are installed. The bicycle may include two wheels, propelled by pedals, and steered by handlebars. The bicycle may be completely human powered, or include an assist motor, such as an electrical assist motor.

Component of a bicycle may include a shifter, wheels, seat post, drive train devices such as one or more derailleurs, a crankset, etc. Some installed bicycle components will include personal area network ("PAN") communication capability for control, diagnostic, or other messages and communication related to component characteristics and/or measured data from sensors or other devices of the installed component device.

The bicycle may include a Bicycle Serial Number (BSN) which is an individual identifier associated with the bicycle. The BSN may be a unique alphanumeric string assigned to the frame of the bicycle for the purposes of identification of associated information. A component having circuitry configured for PAN communication and interaction may include the BSN for identification of the component in the PAN, or other network.

A model is a collection of characteristics, or data representative thereof, which may be stored in a data structure and/or database for use by the remote/cloud service, or elements thereof. A model may be used as an element in the bicycle system. A model may standardize the storage and/or presentation of related characteristic data for other elements of the system. Other information may be included in respective models. For example, properties of real world entities and elements may be included in a model. Models may be constructed and saved in a non-transitory data structure, such as a memory device, and used and/or referenced with a computer program. In an embodiment, one or more models of bicycle system elements are accessible via an Internet type WAN, such as with the interaction of an API. A model may be stored in an associable data structure, for example having a collection of fields and associated data contained therein.

Various models may be stored and/or otherwise used by the bicycle system.

In an embodiment, a user model may be included. The user model may represent a particular identity profile of a human system user, typically a bicycle rider or owner. Characteristics such as name, age, address, and other characteristics, as well as combinations thereof, may be part of the user model. The user model associates characteristics of a particular user within the bicycle system. The user model may include any characteristic of, or associable with, a user. For example, the user model may include the characteristics as indicated in the User Model Table below.

User Model Table id unique identifier to identify the user in the system
Name User Name
Age User Age
email User email
phone_number User phone number
units User desired units (imperial, metric)
language User's desired language In an embodiment, a user interface may be provided to use and manipulate the user model. The user model interface may be configured to be operated on a mobile device, such as with a mobile device software application. Other user model interfaces may be used. Also, other bicycle system functions may be initiated by a user from the user interface. For example, a Delete Account function may be provided.

In an embodiment, the system creates a user model from information a user creates and/or provides through the user model user interface. As indicated above, the user interface may be provided on the mobile device, or another device. The user may have an option to initiate a user model with provided information. The bicycle system may use the user model to identify the user, and characteristic information provided therefrom, within the bicycle system. The bicycle system may use the user model to allow a user to store and retrieve previously provided information, from different devices, while maintaining continuity of the user model within the bicycle system.

In an embodiment, the user model may include preferences and/or setting with regard to the users interaction with the bicycle system. For example, as indicated above, the user may select which language is provided in the user interface. In another example, the user may select which units to be provided for indicated measurements. The bicycle system may allow the user to access and/or modify preferences and settings across devices and platforms.

In an embodiment, a bicycle model may be included. The bicycle model may represent a particular physical configuration of a bicycle, typically a bicycle of the user. In the bicycle system each user may have one or more associated bicycle models. The associated bicycle models of a user may be a part of the user model. For example, associations may be created between a particular user and multiple bicycle models, such as by storing bicycle model unique identifiers with the user model unique identifier.

Characteristics such as bicycle type, color, weight, representative image, and other characteristics, as well as combinations thereof, may be part of the bicycle model. In an embodiment the bicycle model includes information regarding specific component devices installed/affixed on or otherwise used in conjunction with the bicycle, such as the static component devices affixed thereto. The bicycle model associates characteristics of a particular bicycle within the bicycle system. The bicycle model may include any characteristic of, or associable with, a bicycle. For example, the bicycle model may include the characteristics as indicated in the Bicycle Model Table below.

| BICYCLE MODEL TABLE | |
| --- | --- |
| id | Unique Identifier |
| owner | Specific Owner id |
| name | user generate name |
| description | user generate description |
| image | user generated image of bike |
| time_odometer | total time accumulated on bike |
| weight | |
| distance_odometer | total distance accumulated on bike |
| component_set | set of components attributed to the bike |

In an embodiment, a user interface may be provided to use and manipulate the bicycle model. The bicycle model interface may be configured to be operated on a mobile device, such as with a mobile device software application. Other bicycle model interfaces may be used. Also, other bicycle system functions may be initiated by a user from the user interface. For example, a "Save Bike" function may be provided which will save the information provided for the bicycle model in the bicycle system.

In an embodiment, the bicycle model represents a physical configuration of a bicycle in the bicycle system. The bicycle model associates and stores information regarding characteristics of the bicycle. The system may create the bicycle model from information provided by the user or, as will be described, based on data provided by a gateway device. A user may interact with the bicycle model using a mobile device, or another device, by accessing bicycle model data stored on a server system or locally. For example, a user may acquire an image of the particular physical bicycle, and associate that image with the bicycle model. A user may also provide a collection of alphanumeric characters to be used as a name to be associated with the bicycle model.

In a PAN, the installed components of the bicycle may need to be paired together to be able to communicate for appropriate operation of the bicycle. The bicycle model may be used to facilitate the pairing of installed components.

In an embodiment, a component model may be included. The component model may represent a particular physical component device of a bicycle. In the bicycle system each bicycle may have one or more associated component models. The associated component models of a bicycle may be a part of the bicycle model. For example, associations may be created between a particular bicycle model and multiple component models, such as by storing component model unique identifiers with the bicycle model unique identifier. Also, or alternatively, component models may be stored in association with the user model.

Characteristics such as manufacturer, model, representative image, and other characteristics, as well as combinations thereof, may be part of the component model. The bicycle model may include any characteristic of, or associable with, a component. For example, the component model may include the characteristics as indicated in the Component Model Table below.

| COMPONENT MODEL TABLE | |
| --- | --- |
| id | Unique Identifier |
| owner | Specific Owner id |
| name | |
| description | |
| manufacturer | Manufacturer of the component |
| serial | unique identifier from the manufacturer |
| model | type of component |
| distance_odometer | total distance accumulated on component |
| time_odometer | total time accumulated on component |
| registration | user has registered the component |
| history | array of component snapshots in time |
| service_notification | routine maintenance or repair work required (chain replacement, suspension tuning, etc.) |
| alarm_notification | immediate action required (battery, FW, etc.) |

In an embodiment, a user interface may be provided to use and manipulate the component model. The component model interface may be configured to be operated on a mobile device, such as with a mobile device software application. Other component model interfaces may be used. Also, other bicycle system functions may be initiated by a user from the user interface. For example, a "Pair" function may be provided which will initiate pairing activities of the component.

Multiple screen views may be used to organize, present, and manage the component model.

In an embodiment, a component model identifies a physical component within the bicycle system. A user may add the component model to a bicycle model using a bicycle model user interface as provided with a software application on a mobile device, or other device. The user can control when to add, remove, the component model from the bicycle model, or move the component model between different bicycle models. Such modifications of component model associations are saved in a central server, and accessible across platforms.

In an embodiment, the bicycle system may associate use and other statistics and/or data with particular component models. This data may be provided by the data reporting component devices, e.g. sensors or other circuitry of the component device, or inferred from data received as associated with a bicycle model. Data tracked within the component model allows for the bicycle system to create notifications when specific actions occur. Some examples of notifications include:

The battery charge state of the component falls below a specific threshold;

A usage time or distance measurement go above a threshold for component service intervals such as chain replacement, suspension servicing, etc.;

The bicycle system allows for automatic bicycle selection when the component is detected within a user's activity or when paired to our mobile/web software applications;

The bicycle system allows for lifetime usage statistics such as: runtime, distance, actuations counts, shift counts, revolution counts, total energy, etc.;

The bicycle system allows users to change component model associations between bicycle models or between other user models;

The bicycle system allows users to officially claim ownership by providing registration information regarding the specific physical components; and/or The bicycle system allows users to see real-time battery status, such as may be provided in the component model user interface and/or the bicycle model user interface as indicated in the example above.

In an embodiment, the bicycle system may associate multiple bicycle models with a single user model, thus allowing a user to login to the system and access a list of bicycles associated with the user. The list of bicycles includes a list of individual identifiers, such as a respective serial number, of the components installed on the bicycle. The user can then select the bicycle model, or component model, from a visual presented list in order to make a pairing connection, or initiate other actions, for that component. Component selection from a visual list that is associated with a bicycle model is the easiest way for a user to connect to their components in a busy in environment, such as a bike shop, bike event, where there may be a large number of bicycles all of which may have several wireless communication enabled devices. This identification of associated component models, and wireless communication of component model data to the bicycle system, saves the user from identifying their component by less convenient methods such as reading the serial number of the device, or guessing. As will be described below, the disclosed embodiments enabled the bicycle system/remote service to automatically identify the bicycle model with minimal or no user interaction.

Component model information may be presented in association with the bicycle model, for example in a bicycle model user interface. Presenting component information in association with a bicycle model allows users to review bicycle maintenance needs in terms of the bicycle, not with an association to a component serial number that a user may not readily identify.

In an embodiment, cycling activities, such as time, distance, and/or type of use, may be recorded on a bicycle head unit. For example, the bicycle head unit may include a GPS tracking device enabled to track distance and/or time of use data at the bicycle level. This bicycle level activity data can then be associated with the bicycle model, and used to determine actions related to the components installed on the bicycle. The activities related to a particular bicycle therefore directly imply the usage accumulated on the components of the bicycle. Bicycle usage data can be calculated and accumulated for each component associated with the bicycle on a particular ride, or across a collection of rides.

Figure 2:
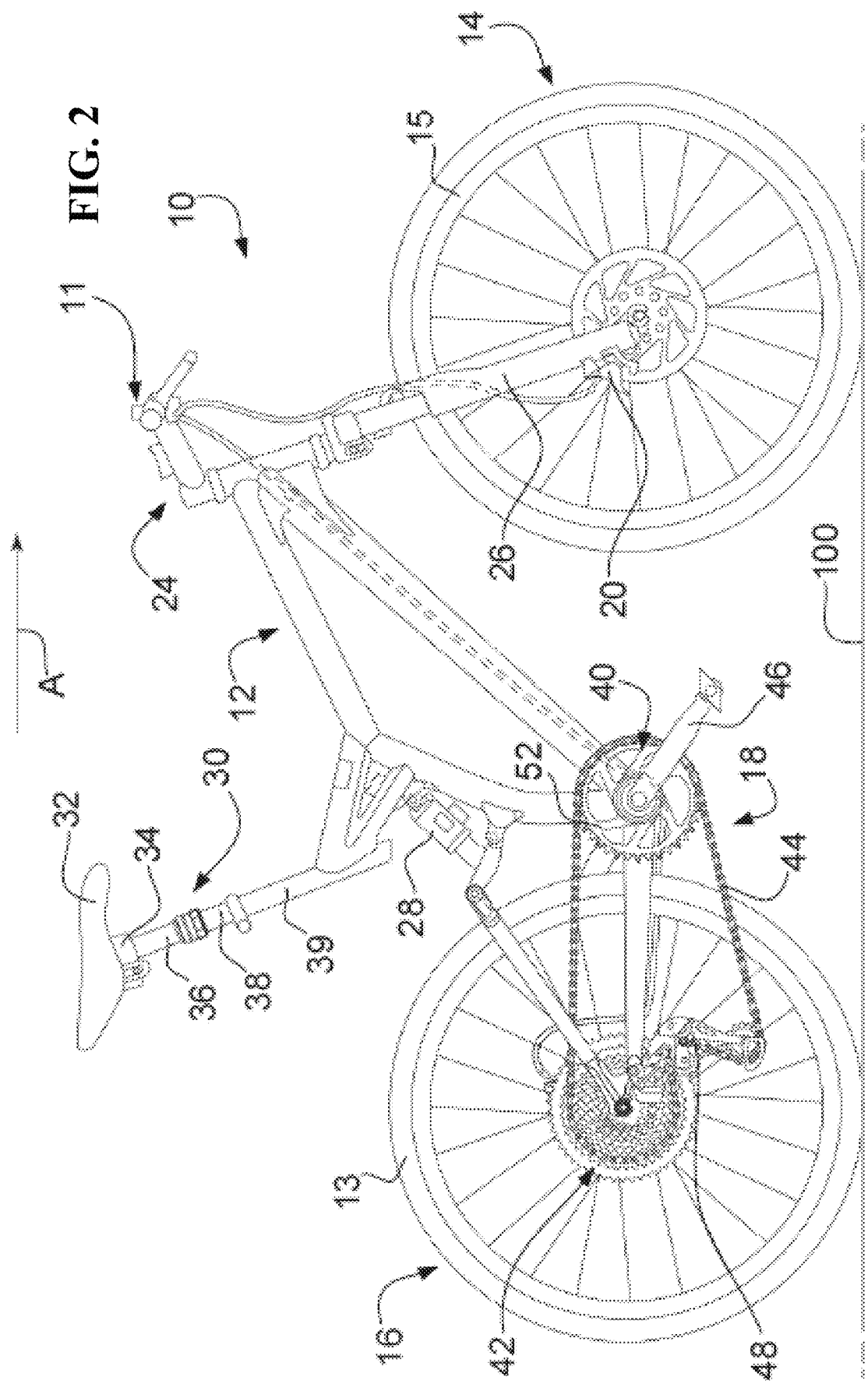
FIG. 2 depicts another example bicycle for use with the disclosed embodiments.

FIGS. 1 and 2 illustrate examples of bicycles from which bicycle models may be created, stored, communicated, and/or otherwise manipulated by the bicycle system.

FIG. 1 generally illustrates a bicycle 10 of a road-type configuration with which a which may be used in a bicycle system. The bicycle 10 includes a frame 12, front and rear wheels 14, 16 rotatably attached to the frame 12, and a drivetrain 18. A front brake 20 is provided for braking the front wheel 14 and a rear brake 22 is provided for braking the rear wheel 16. Each of the front and rear wheels 14, 16 includes a tire 13 attached to a rim 15, where the tire 13 is configured to engage the riding surface 100. A handlebar assembly 24 is provided for steering the front wheel 14. The direction of arrow "A" indicates a front and/or forward orientation of the bicycle 10. As such, a forward direction of movement for the bicycle 10 corresponds to the direction A.

Other configurations of the bicycle 10 are contemplated. For instance, FIG. 2 depicts the bicycle 10 having a mountain-type configuration. Potential differences between bicycles of various configurations include those depicted between FIGS. 1 and 2. For example, FIG. 1 depicts the handlebar assembly 24 in a drop-type configuration, whereas the example in FIG. 2 has a flat-type configuration of the handlebar assembly 24. The example in FIG. 2 also includes a front suspension component 26 for movably mounting the front wheel component 14 to the frame 12 and a rear suspension component 28 for movably mounting the rear wheel component 16 to the frame 12. The front and rear suspension components 26, 28 may include one or more of an adjustable suspension mechanism such as a spring or damper. An adjustable seating component 30, such as an adjustable seat post is also shown in this example configured to movably attach a saddle 32 to the frame 12. The adjustable seating component 30 may include a seat post head 34 attachable to the saddle 32 and connected to a seat post upper 36. The seat post upper 36, the seat post head 34, and the saddle 32 may be configured to move relative to a seat post lower 38 fixably attached to the frame 12. For instance, the seat post upper 36 may ride within the seat post lower 38, where the seat post lower 38 is fixed to a seat tube 39 of the frame 12.

FIGS. 1 and 2 each depict an embodiment of a drivetrain 18 including a chainring assembly component 40 rotatably mounted to the frame 12, a sprocket assembly component 42 mounted to the rear wheel component 16, and a chain component 44 engaging the chainring assembly component 40 and the sprocket assembly component 42, which may be a rear sprocket assembly component. The chainring assembly component 40 may be attached to a crank arm component 46 to facilitate torque transfer from a rider to the rear wheel component 16 through the chainring assembly component 40, to the chain component 44, and to the sprocket assembly component 42. The chain 44 may be shifted through a plurality of sprockets of the sprocket assembly component 42 with a drivetrain actuator such as a rear gear changer component 48. The plurality of sprockets of the sprocket assembly component 42 may be arranged by radius, for example each further outboard sprocket having a smaller radius than the last. The chain component 44 may also be shifted through a plurality of chainrings of the chainring assembly component 40 with a front gear changer 50. The plurality of chainrings of the chainring assembly component 40 may be arranged by radius, for example each further outboard chainring having a larger radius than the last. Alternatively, as in FIG. 2, the front gear changer component 50 may be omitted as when the chainring assembly 40 consists of one chainring 52. In an embodiment, the drivetrain may include a power meter component configured to measure power input into the bicycle. For example, the chainring assembly component 40 may include the power meter component.

Any component of a bicycle, such as those described herein, or others, may be have associated information, such as a component model, included or associated with a bicycle model. For example, components may include wireless communication circuitry for communication with a personal area network ("PAN"). Such components may include front and/or rear gear changers, front and/or rear suspension components, seat-post components, wheel components, shifter components, brake components, as well as other components. In an embodiment, an aggregating component device, for example a rear gear changer or derailleur, may be configured to communicate with other components of the PAN and accumulate and/or otherwise aggregate data of the other components. The aggregating component device may then be configured to communicate this aggregated data to an external computer, such as a bicycle head unit.

A PAN may refer to the interconnection of information technology devices or gadgets within the environment of an individual user (typically within ten (10) meters or 33 feet). These interconnected devices might include various mobile devices such as laptop computers, personal digital assistants (PDAs), cellphones, printers, PCs or other wearable computer devices, bicycle head units, or bicycle components with communication circuitry.

A gateway device, such as a bicycle head unit, may be an element in a bicycle system. A bicycle head unit may be a mobile device specifically configured and/or purpose built for use with a bicycle. For example, a bicycle head unit may include physical structure configured for mounting to a frame and/or handlebar of a bicycle, such as a bicycle specific mounting system. A bicycle head unit may also, or alternatively, include appropriate circuitry for PAN communication with installed bicycle components, or other devices of the bicycle system within an immediate proximity. Further, a bicycle head unit may have other bicycle application specific characteristics to cause the mobile device to be suitable as a bicycle head unit. For example, the bicycle head unit may include a daylight readable display. In an embodiment the bicycle head unit may include a rugged and/or waterproof casing or exterior configured to protect internal circuitry of the device during operation of the bicycle.

Other components may include additional sensors, such as a pedaling or pedal-speed sensor, a wheel-speed sensor, or other sensors may be included with a bicycle, and connected to the bicycle system with associated data, such as in a component model. Some components may be controllable in real-time, provide bicycle dynamic data in real-time or periodically, or combinations thereof. The provided information and data may be used, manipulated, and/or communicated by the bicycle system.

Figure 3:
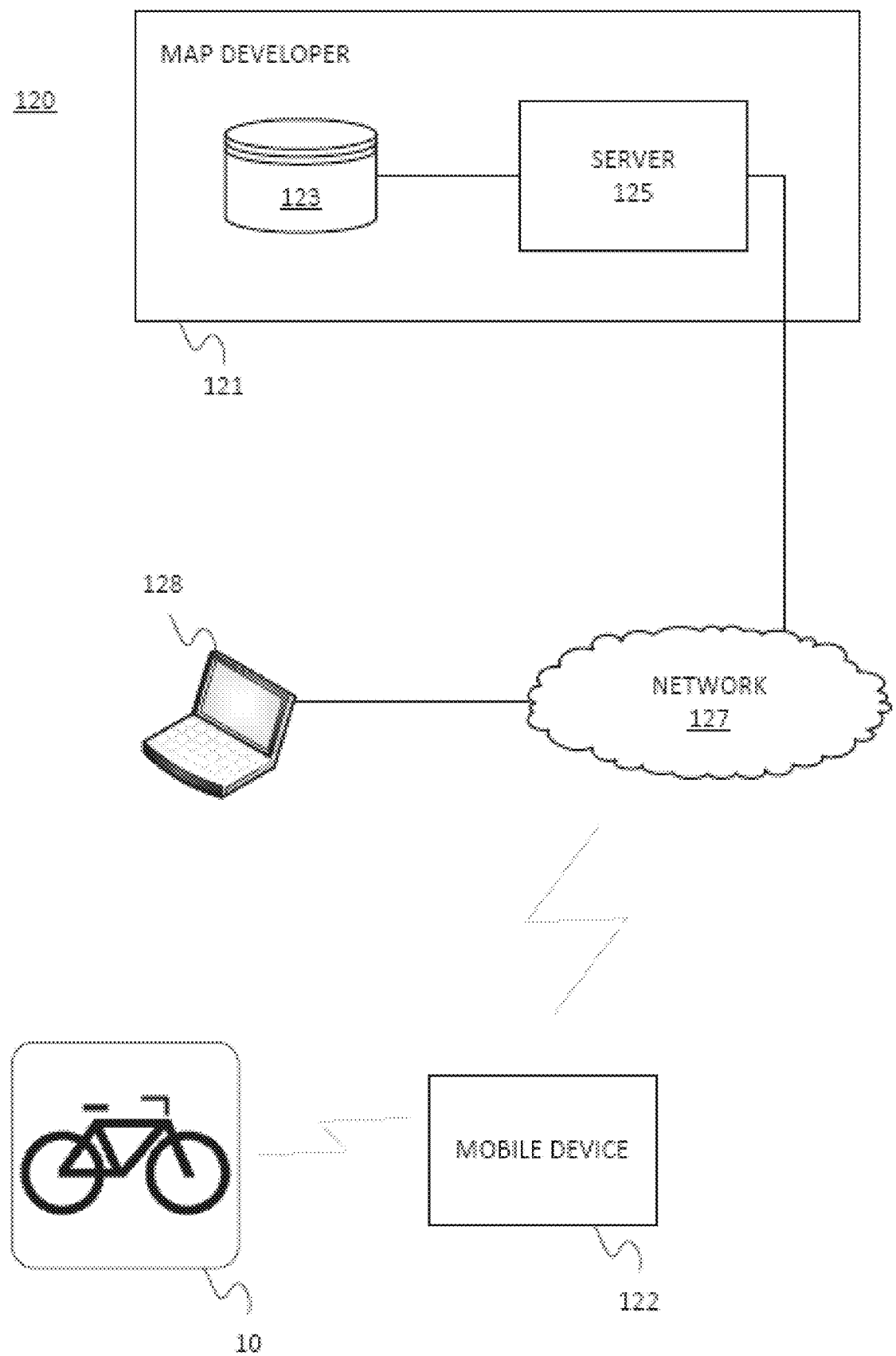
FIG. 3 depicts a block diagram of an example bicycle system for use with the disclosed embodiments.

FIG. 3 illustrates an exemplary bicycle system 120. The bicycle system 120 includes a central developer system 121, a gateway device 122, and a network 127, for example a communication network such as a LAN as described herein. Additional, different, or fewer elements may be provided. For example, many gateway devices 122 may connect with the network 127.

The bicycle system one or more bicycle models, representative of one or more bicycles 10, respectively. The bicycle 10 may include a head unit configured to communicate bicycle data and/or component information with the gateway device 122, for example wirelessly. The components of the bicycle may, alternatively or additionally, be configured to communicate with the gateway device 122 directly.

The developer system 121 includes a server 125 and a database 123. The developer system 121 may include computer systems and networks of a system operator. The database 123 contains user models, bicycle models, component models, and other data. The database 123 may be partially or completely stored in the gateway device 122 and/or in proximity to the server. In an embodiment, the database is at least stored entirely at the server 125 to facilitate access to the information of the database from multiple platforms through the network 127.

The developer system 121 and the gateway device 122 are coupled with the network 127. The phrase "coupled with" is defined to mean directly connected to or indirectly connected through one or more intermediate components. Such intermediate components may include hardware and/or software-based components. The database 123 includes model data used for the bicycle system.

A gateway device 122 is a portable computing device. A gateway device 122 may be a handheld computer, for example a smartphone or tablet, with touch interface. A mobile device may also include WAN data connectivity.

The gateway device 122, bicycle head unit, and/or other bicycle component may include a GPS tracking device, for example including one or more detectors or sensors as a positioning system built or embedded into or within the interior of the particular device, such as the gateway device 122. Alternatively, the gateway device 122 uses communications signals for position determination. The gateway device 122 receives location data from the positioning system. The server 125 may receive sensor data configured to describe a position of a mobile device, or a controller of the gateway device 122 may receive the sensor data from the positioning system of the gateway device 122. The gateway device 122 may also include a system for tracking mobile device movement, such as rotation, velocity, or acceleration. Movement information may also be determined using the positioning system.

The gateway device 122 may communicate location and movement information via the network 127 to the server 125. The server 125 may use the location and movement information received from the gateway device 122 to associate the gateway device 122 with a geographic region, or a road of a geographic region, described in the database 123. The server 125 may also associate the gateway device 122 with a geographic region, or a road of a geographic region, manually.

The server 125 may receive location and movement information from multiple location devices, such as a GPS tracking device, over the network 127. The location and movement information may be in the form of mobile device data. The server 124 may compare the mobile device data with data of a road system stored in the database 123.

The computing resources for bicycle system operation may be divided between the server 125 and the gateway device 122. In some embodiments, the server 125 performs a majority of the processing. In other embodiments, the gateway device 122 performs a majority of the processing. In addition, the processing is divided substantially evenly between the server 125 and the gateway device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

FIG. 4 illustrates an exemplary gateway device, such as a mobile device, of the bicycle system of FIG. 3. The gateway device 122 may be referred to as a communication or navigation device. The gateway device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the gateway device 122. The gateway device 122 is a smart phone, a mobile phone, a personal digital assistant (PDA), a tablet computer, a notebook computer, a personal navigation device (PND), a portable navigation device, and/or any other known or later developed mobile device. In an embodiment, a bicycle head unit may be considered a mobile device, or the mobile device may be integrated into a bicycle. The positioning circuitry 207, which is an example of a positioning system, is configured to determine a geographic position of the gateway device 122. The movement circuitry 208, which is an example a movement tracking system, is configured to determine movement of a gateway device 122. The position circuitry 207 and the movement circuitry 208 may be separate systems, or segments of the same positioning or movement circuitry. In an embodiment, components as described herein with respect to the gateway device 122 may be implemented as a static device. For example, such a device may not include movement circuitry 208. In an embodiment, the gateway device may be a component device, such as a derailleur or other gear changer.

The positioning circuitry 207 may include suitable sensing devices that measure the traveling distance, speed, direction, and so on, of the gateway device 122. The positioning system may also include a receiver and correlation chip to obtain a GPS signal. Alternatively or additionally, the one or more detectors or sensors may include an accelerometer and/or a magnetic sensor built or embedded into or within the interior of the gateway device 122. The accelerometer is operable to detect, recognize, or measure the rate of change of translational and/or rotational movement of the gateway device 122. The magnetic sensor, or a compass, is configured to generate data indicative of a heading of the gateway device 122. Data from the accelerometer and the magnetic sensor may indicate orientation of the gateway device 122. The gateway device 122 receives location data from the positioning system. The location data indicates the location of the gateway device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the gateway device 122. The positioning system may also include a receiver and correlation chip to obtain a GPS signal. The gateway device 122 receives location data from the positioning system. The location data indicates the location of the gateway device 122.

A GPS tracking unit is configured to establish a geographic location of the tracking unit, and may include circuitry configured for WAN data connectivity. In an embodiment, the GPS tracking unit may report the position of the bicycle in real time or periodically through a communication network such as a WAN or PAN.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine gateway device 122 movement.

Positioning and movement data obtained from a mobile device may be considered geographic data, device data, bicycle data, and/or mobile device data.

The input device 203 may be one or more buttons, keypad, keyboard, mouse, stylist pen, trackball, rocker switch, touch pad, voice recognition circuit, or other device or component for inputting data to the gateway device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The communication interface 205 is configured to send mobile device movement and position data as well as user models, bicycle models, component models, and other bicycle data to the server 125. The movement and position data sent to the server 125 may be used to associate bicycle data, such as active gearing, velocity, or other data, with geographic locations. The communication interface 205 may also be configured to receive data from the bicycle system, such as various models. The position circuitry 207 is configured to determine the current location of the mobile device. The controller 200 may be configured to determine a calculate and/or otherwise determine messages relating to bicycle data determined for the user. The controller 200 may also be configured to determine a visual indication to a display that represents messages related to various models or bicycle system outputs for a user. The output interface 211 may be configured to present a visual indication of the various models to a user of the gateway device 122. The output interface 211 may also be configured to present warnings and other messages to a user.

Figure 5:
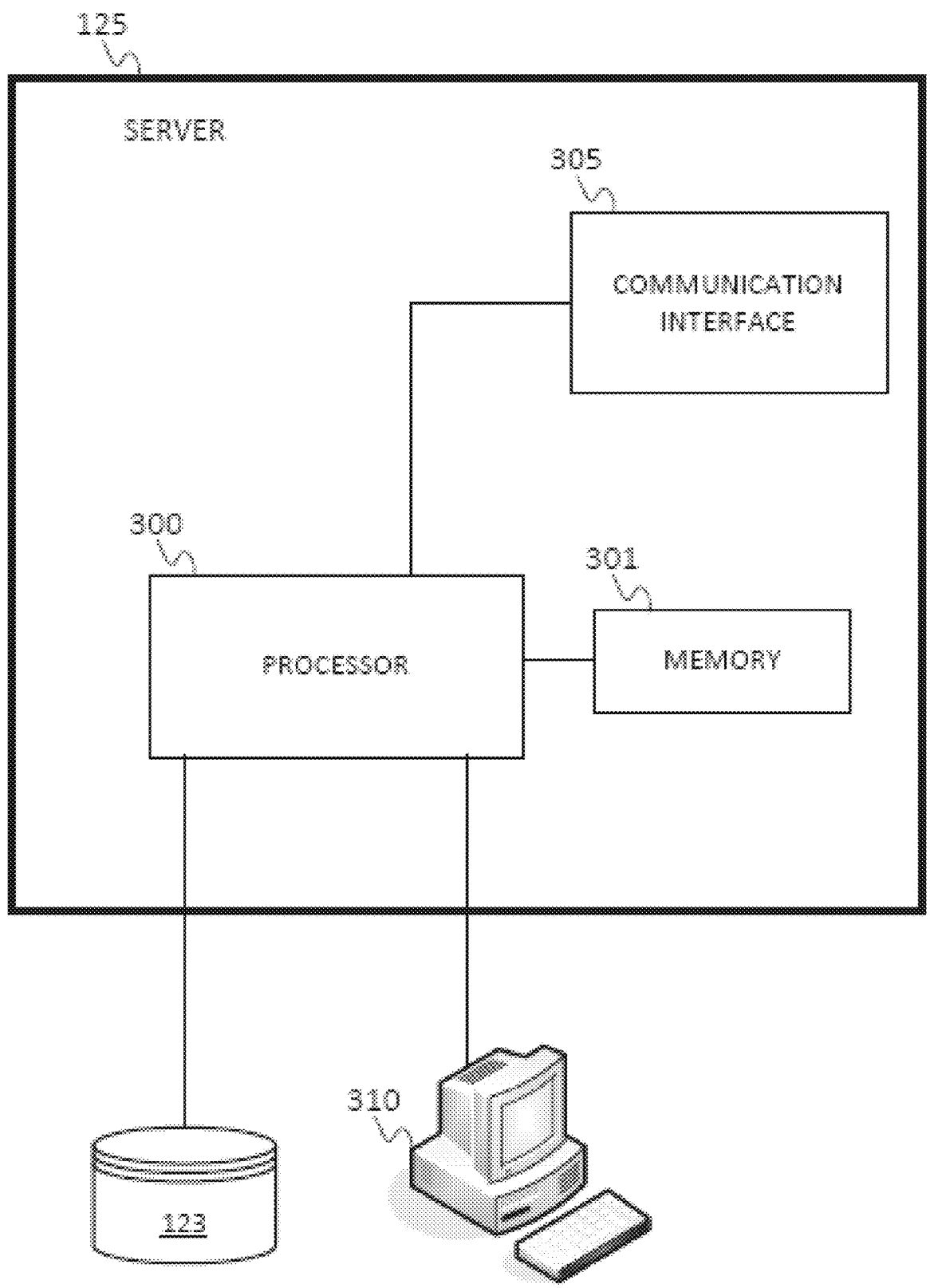
FIG. 5 depicts a block diagram of an example server for use with the bicycle system of FIG. 3.

FIG. 5 illustrates an exemplary server of the bicycle system of FIG. 3. The server 125 includes a processor 300, a communication interface 305, and a memory 301. The server 125 may be coupled to a database 123 and a workstation 310. The database 123 may be a bicycle information database configured to store various models of the bicycle system. The workstation 310 may be used as an input device for the server 125. In addition, the communication interface 305 is an input device for the server 125. The communication interface 305 may receive data indicative of use inputs made via the gateway device 122 or other platforms.

The communication interface 305 is configured to receive mobile device data of a plurality of gateway devices 122. The processor 300 may be configured to calculate values for a user.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

As discussed above, a cyclist may own multiple configurable bicycles, each having a particular set of data reporting component devices and may alter the configuration of one or more of their configurable bicycles by adding a new component device, removing an existing component device or moving one or more of those data reporting component devices between their bicycles. Further, a given data reporting device may fail, e.g. due to a depleted battery or loss of connectivity, or otherwise be defective, resulting in a lack of data reporting therefrom (giving the appearance that is has been removed). Additionally, a cyclist/user may initiate or perform a session/ride where there are numerous other bicycles all with similar devices, such as in a bike shop or when riding in a pack with other cyclists, where their bicycle's gateway device, e.g. head unit, receives and relays data from one or more nearby data reporting component devices of the another bicycle.

As described above, the cyclist may register each bicycle, and its present configuration of components, with the remote service, e.g. create a bicycle model, and associated component models, for each of their bicycles in association a user model created for the cyclist, etc. Each time the cyclist modifies one or more of their bicycles to alter the set of data reporting components affixed thereto or utilized therewith, they may access the remote service and update the various data models stored therein. However, this may be highly inconvenient and/or prone to inaccuracies, and a given cyclist may wish to alter the configuration of the bicycle and immediately thereafter begin a session/ride without having to spend time logging into a remote service and making updates therein. The disclosed embodiments enable the remote service to automatically identify the cyclist's particular bicycle, or otherwise disambiguate among the cyclist's multiple bicycles, based on the data that is received by the remote service from at least a subset of the data reporting component devices of the bicycle in use.

In one embodiment, upon activation, power on or wake from an idle state, the gateway device, e.g. the bicycle head unit, may create and send to the remove service an inventory of the data reporting component devices, or otherwise retrieve and send a previously stored inventory. Alternatively, or in addition thereto, the head unit may begin relaying data received from one or more of the data reporting component devices to the remote service.

As the remote service receives data relayed by a gateway device, e.g. a data stream, it may segregate, separate or otherwise delineate that data based on an association with an identifier, such as an IP address, MAC address, serial number, or other identifier of the gateway device.

It will be appreciated that the gateway device may relay data from each data reporting component device separately to the remote service as it is received, e.g., in real time, or in accumulated batches, or accumulate data from multiple data reporting component devices and transmit the accumulated data to the remote service, etc. In one embodiment, for example where the gateway device does not have WAN connectivity, all of the data accumulated for a session/ride may be communicated to the cloud service in batch, such as upon completion of the session/ride when the user connects the head unit to the WAN, such as via a personal computer or mobile device.

The data received from a given data reporting component device may include an identifier identifying the device, such as a serial number, MAC address, IP address, port number, or other identifier, the type of device, and the operational/sensed data generated thereby. The data may further include an identifier of the gateway device from which it was relayed, such as the IP address or other identifier. The data may further include error detection/correction data, previously transmitted data, checksums or other data which facilitates error correction/detection, data recovery and/or reliable transmission.

In one embodiment, the cyclist/user, prior to the receipt of any data from a data reporting component device, may have configured at least one bicycle model and associated component models, with the remote service. Alternatively, or in addition thereto, a model for the particular bicycle the cyclist is going to ride does not exist in the remote service. In one embodiment, the remote service requires at least one bicycle model to have been previously created. As will be described, the remote service, upon determination that the incoming data does not identify any previously created bicycle model, may dynamically create a new bicycle or, as will be described, a sub-model of an existing bicycle model, with which to associate the incoming data.

In one embodiment, where, upon initiation of a session/ride, the head unit of the bicycle communicates an inventory of data reporting component devices to the remote service, the remote service may use the received inventory to identify a previously stored bicycle model by comparing at least a subset of the inventoried component devices, e.g. the static devices, with the stored bicycle models. The remote service may first identify all bicycle models associated with the head unit, based on the identifier thereof, or based on the cyclist/user, e.g. where the cyclist/user is required to login or otherwise indicate to the remote service that they are commencing a session/ride. The remote service may then compare the inventory of component devices with each bicycle model to identify an exact or substantial match there between. In one embodiment, a match is determined when a threshold number/subset of component devices identified in the inventory match a subset of component devices of a given bicycle model. Where a bicycle model is identified, subsequently received data from the data reporting component devices is associated therewith.

In one embodiment, if the received inventory of component devices includes more or fewer component devices than the bicycle model determined to be a match, the remote service may update the bicycle model to remove or add components according to the inventory, or may create a new model or a sub-model of the matching model.

Alternatively where an initial inventory is not received from a head unit, or in addition thereto, the remote service may identify, or supplement the identification process of, the bicycle in use based on the data received from the various data reporting component devices. As discussed above, this data may identify both the data reporting device itself, as well as the gateway device from it was relayed to the remote service, along with the sensed/generated data.

As was described above, in one embodiment, upon activation of the gateway device, the data reporting component devices may be inventories, polled or otherwise caused to report their presence and/or status. Alternatively, as each data reporting component device is utilized or actuated or the sensed physical parameter changes, the device may begin to report data. In some cases a device may fails to report, such as due to a depleted battery, communications interference, or a defect/fault.

The remote/cloud service will begin to receive data from the various data reporting component devices. Depending the implementation and/or the activity of the various devices, at given time data from only a subset of the data reporting component devices may be received.

As remote/cloud service receives data from all, or a subset, of the data reporting component devices, it may begin determine if a matching bicycle model has been previously created. In one embodiment, the process may commence using the gateway identifier to identify all previously created bicycle models associated therewith. The remote service may then compare those data reporting component devices from which data has been received with the component models associated with each identified bicycle model. In one embodiment, only a subset of the data reporting component devices, e.g., only the static devices, may be compared. If the remote service determines that a threshold number, e.g. all or some number less than all, of devices match those associated with a given bicycle model, the remove service will determine that a match has been found and associate the received data therewith.

Alternatively, or in addition thereto, the remote service may attempt to match each data reporting device from which data is received with the previously stored component models and, upon identifying a match, determine the bicycle models associated therewith. As data is received from additional data reporting component devices, the process may be repeated to narrow down the bicycle model that is associated with a threshold number of reporting component devices. In one embodiment, the matching process may wait until data has been received from a threshold number of data reporting component devices before attempting to find a previously created bicycle model. In one embodiment, where the cyclist affixes or activates an existing or new component device during their session/ride, the remote service may factor in the data received therefrom into the matching process.

In some embodiments where the gateway device may receive and relay data from nearby data reporting devices that are not actually affixed to, or being utilized with, the user's bicycle, such as may occur in bike shop or when the bicycle is being operated proximate to other bicycles, the remote service may implement a discrimination process to ignore the irrelevant data. Such discriminatory processes may be based on a temporal and/or contextual basis, e.g. based on an assumption that devices affixed to or utilized with the same bicycle will report data at substantially the same time, that bicycles are assumed to comprises particular minimal or maximal device configurations, and/or that devices affixed to or utilized with the same bicycle will report data that is consistent with their being utilized during the same session/ride. For example, where data is being received indicative of an active component and the errant data is indicative of inactivity, the errant data may be ignored. If the errant data is received from a data reporting device that is the same device type as is reporting other data, and it is known that a bicycle would only have one such component, the system may ignore the data from the component device which is inconsistent with data being received from other component devices, e.g. where the activity level, rate, cadence, etc. reported is inconsistent. Furthermore, the remote service may discriminate based on the identified bicycle models. For example, where the data reporting devices from data is received substantially match an previously created bicycle model, data from additional reporting devices not associated with the identified bicycle model may be ignored, particularly where the data is indicative of a duplicative device. For example, where a particular component previously reported data in combination with another particular component and is now reporting data in combination with a different component, the particular component may be determined to have been moved to a different bicycle.

As was described above, where a previously created bicycle model cannot be identified, or the received data only partially matches a previously created bicycle model, a new bicycle model or sub-model, e.g. variant, may be created.

As described above, the remote service may determine a match with a previously created bicycle model when data is received from one or more of a subset of data reporting component devices, e.g. one or more of the device characterized as static. It will be appreciated that the remote service may further base the matching process on whether or not one or more of the other data reporting device, e.g. the dynamic devices, also match the candidate bicycle model(s) so as to, for example, confirm or increase the confidence level of a match. Alternatively, data reporting component devices may be assigned weighting values, such as based on their likelihood to be moved between bicycles, wherein the weighting values of those data reporting devices which match a candidate bicycle model are assessed, e.g. summed and compared with a threshold, to determine if there is a match. Such an implementation may allow a match to determined based on any subset of the data reporting component devices of a given bicycle. The remote service may further define a minimal number of components from which data must be received in order to undertake the matching process, e.g. in order to determine a match with a sufficient confidence level.

The disclosed embodiments may automatically uniquely identify a particular bicycle based on the combination/configuration of data reporting component devices when an owner/rider adds, removes, or replaces a data reporting component device or a data reporting component device fails to report data. Based on all, or a subset of the data reporting component devices from which data is received, the remote service queries a database coupled therewith storing previously identified bicycle configurations, i.e. bicycle models, which may result in no match, an exact match or a partial match, e.g. the subset of data reporting component devices entirely matches at least a subset of the component device associated with a particular bicycle model or a subset of the subset of data reporting component devices entirely matches at least a subset of the component device associated with a particular bicycle model. Where a match may be identified with more than one previously created bicycle model, other data may be factored in to favor a particular model. Alternatively, the user/rider may be prompted to select the correct model. Where no match, or a partial match, is determined, the remote service may create a new bicycle model or a sub-model/variant model associated with the partially matching bicycle model.

In one embodiment, if the subset of static data reporting component devices for which data has been received matches at least a subset of the components associated with a previously created bicycle model, a match therewith is determined. In this embodiment, the remaining static data reporting component devices associated with the matching bicycle model for which data was not received are assumed to have not yet reported or otherwise failed, e.g. due to a dead battery. In one embodiment, the remote service may transmit a notification indicative thereof to the cyclist/user, such as via their gateway device or mobile device. Where unique match with a previously created bicycle model cannot be determined, the user/cyclist may be prompted to select appropriate model. Where data is not received from any of the static data reporting component devices but data is received from one or more dynamic data reporting component devices and those devices are determined to uniquely match a previously created model, a match therewith may be determined.

In one embodiment, where a match cannot be determined, the received data may be buffered and stored in association with the user such that the next time the accesses the remote service, they may be prompted to identify the bicycle model or create a new bicycle model, e.g., accept the service's automatically created model, with which to associate the received data.

Herein, the phrase "coupled with" is defined to mean directly connected to or indirectly connected through one or more wired and/or wirelessly connected intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group including A, B, . . . and N, that is to say, any combination of one or more of the elements A, B, . . . or N including any one element alone or in combination with one or more of the other elements which may also include, in combination, additional elements not listed.

Figure 6:
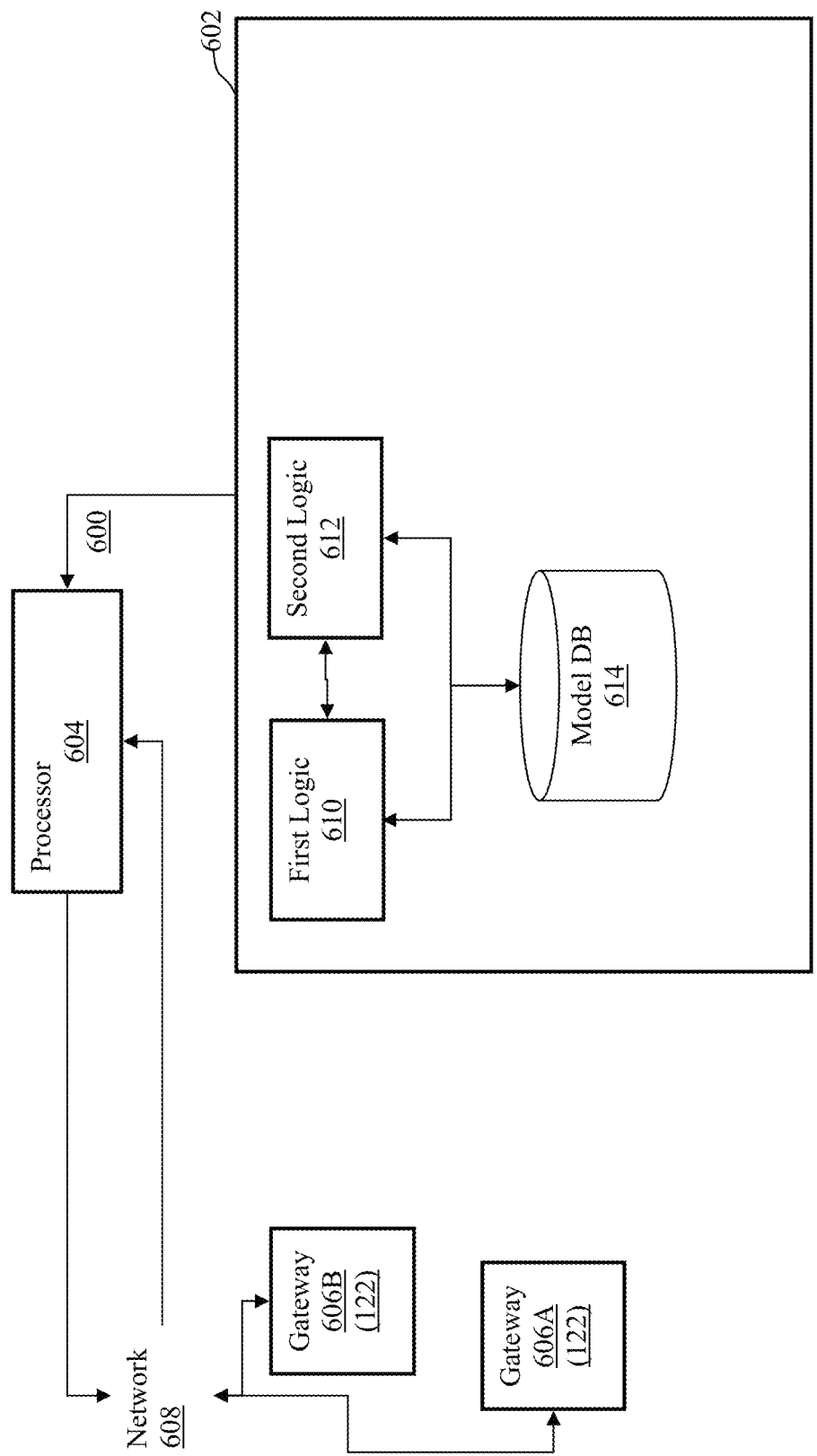

FIG. 6 depicts a block diagram of a system 600, e.g. a bicycle system or portion thereof, according to one embodiment, for remotely automatically identifying a configurable vehicle, such as a bicycle 10 comprising a plurality of component devices, each of which transmits data to be received by the system 600. As described herein, the plurality of component devices of the configurable vehicle comprises devices operative to generate and transmit data to the gateway device 122 as well as devices not operative to generate and transmit data to the gateway device 122. In one embodiment, the plurality of component devices of the configurable vehicle comprise static component devices and dynamic component devices, wherein static component devices are component devices which are less likely to be moved to a different configurable vehicle than dynamic component devices. In one embodiment, the static component devices comprise one or more of a derailleur, crank, power meter or seat post, and the dynamic component devices comprise one or more of a tire pressure sensor, pedal power meter, battery or suspension mechanism. In one embodiment, the data transmitted by a component device comprises data identifying the component device and/or data indicative of the operation thereof. In one embodiment, the gateway device 606 (122) is in communication with at least the subset of component devices via a first network and in communication with the receiver via a second network different from the first network.

The system 600 may be implemented as a separate component or as one or more logic components, such as on an FPGA that may include a memory 602 or reconfigurable component to store logic and a processing component to execute the stored logic, or as computer program logic, stored in the memory 602, or other non-transitory computer readable medium, and executable by a processor 604, such as a specifically configured processor or the processor 802 and memory 804 described below with respect to FIG. 8. In one embodiment, the system 600 is implemented by a server computer, e.g. a web server, such as the server computer 125 described herein with respect to FIG. 5, coupled with one or more gateway devices 606, such as gateway device 122, described above and with respect to FIG. 4, computers, mobile devices, etc. via a wired and/or wireless electronic communications network 608, such as a wide area network, local area network, and/or radio, in a network environment 108 or the network 820 described below with respect to FIG. 8. In one embodiment, gateway devices 606 interact with the system 600 of the server computer via the network 108 to provide inputs thereto and/or receive outputs therefrom as described herein. The system 600 may also be implemented with one or more mainframe, desktop or other computers, such as the computer 800 described below with respect to FIG. 8.

Figure 8:
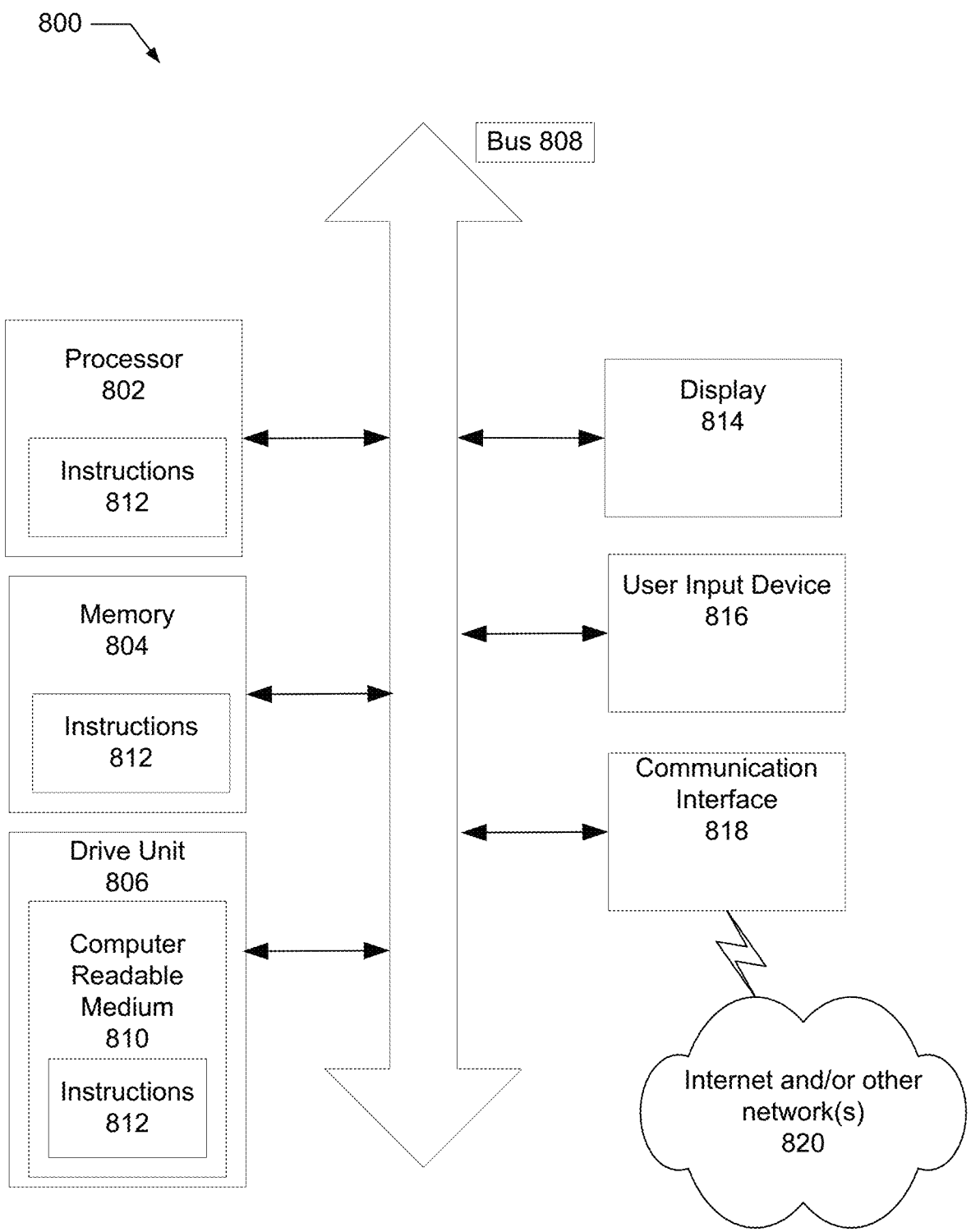
FIG. 8 depicts a block diagram of an illustrative embodiment a general computer system which may be used to implement the system of FIGS. 3-7.

The system 600 includes a data receiver 610 which may be implemented as a separate component or as one or more logic components, e.g. first logic, such as on an FPGA that may include a memory or reconfigurable component to store logic and a processing component to execute the stored logic, or as computer program logic, stored in the memory 602, or other non-transitory computer readable medium, and executable by a processor 604, such as a specifically configured processor or the processor 802 and memory 804 described below with respect to FIG. 8, to cause the processor 604 to, or otherwise be operative to, receive, via a network 608 from a gateway device 606 (122) operative to receive data from one or more of the plurality of component devices of the configurable vehicle and forward the received data to the receiver 110, data identifying at least a subset of the component devices;

The system 600 further includes a vehicle identifier 612 coupled with the data receiver 610 and which may be implemented as a separate component or as one or more logic components, e.g. second logic, such as on an FPGA that may include a memory or reconfigurable component to store logic and a processing component to execute the stored logic, or as computer program logic, stored in the memory 602, or other non-transitory computer readable medium, and executable by a processor 604, such as a specifically configured processor or the processor 802 and memory 804 described below with respect to FIG. 8, to cause the processor 604 to, or otherwise be operative to, access a database 614 coupled therewith and comprising a plurality of data records, each of which is associated with a previously identified configurable vehicle and storing data identifying a set of component devices of which the associated previously identified configurable vehicle was comprised when it was identified.

The vehicle identifier 612 is further configured to compare at least a subset of the received data, e.g. a threshold amount, with the stored data of one or more of the data records and generating a result based thereon, and determine whether the received data is from a previously identified configurable vehicle based on the result of the comparison, wherein when the subset of the component devices identified by the received data matches a set of component devices identified by the stored data of a data record associated with a particular previously identified configurable vehicle, the configurable vehicle from which the data was received is identified as the particular previously identified configurable vehicle.

In one embodiment, the vehicle identifier 612 is further configured to compare the subset of the received data identifying only static component devices with the stored data of one or more of the data records and generating a result based thereon.

In one embodiment, when the subset of the component devices identified by the received data matches at least a subset of a set of component devices identified by the stored data of a data record associated with a particular previously identified configurable vehicle, the vehicle identifier is further configured to identify the configurable vehicle from which the data was received as the particular previously identified configurable vehicle.

In one embodiment, where the received data identifies component devices not identified in the data record, the vehicle identifier 612 is further operative to update the data record to include data identifying those component devices identified by the received data but not present in the data record. In one embodiment, where the received data does not identify component devices identified in the data record, it may be presumes they are defective, have a depleted battery, etc.

In one embodiment, when the subset of the component devices identified by the received data does not match at least a subset of a set of component devices identified by the stored data of a data record associated with a particular previously identified configurable vehicle, the vehicle identifier is further configured to identify the configurable vehicle from which the data was received as a newly identified configurable vehicle and creating a data record in the database in association therewith and storing the received data therein.

In one embodiment, when the subset of the component devices identified by the received data matches a set of component devices identified by the stored data of a data record associated with the particular previously identified configurable vehicle, the data receiver 610 is further configured to receive, subsequent to the receipt of the data identifying at least a subset of the component devices, data associated with the operation of at least a subset of the identified subset of component devices, and associate the received data associated with the operation of at least a subset of the identified subset of component devices with the data record associated with the particular previously identified configurable vehicle. Data indicative of operation may include a sensed parameter, operational state, battery status, etc. and may be provided continuously, periodically or event driven.

Figure 7:
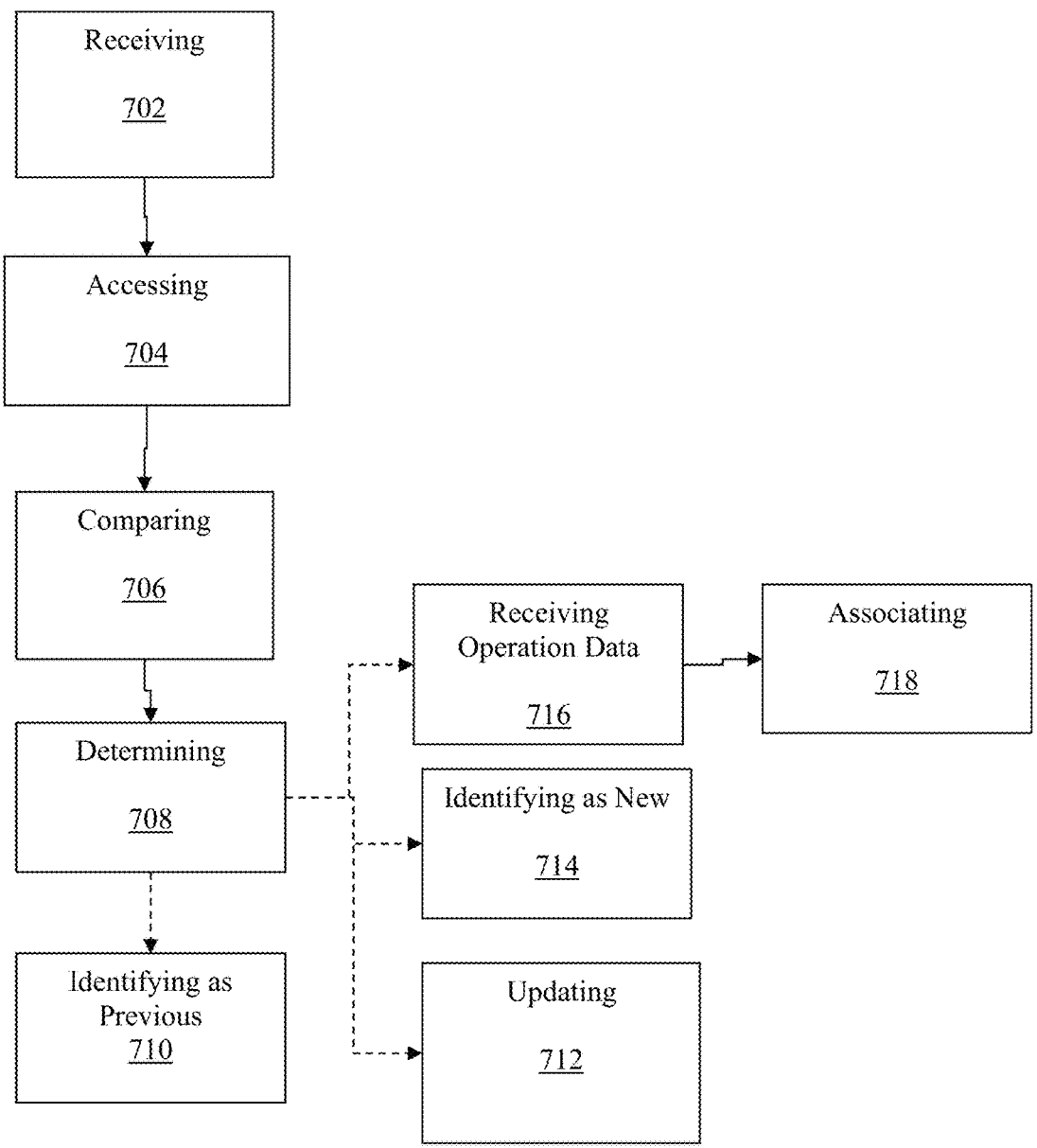
FIG. 7 depicts a flow chart showing the operation of the system of FIG. 6.

FIG. 7 depicts a flowchart 700 showing the operation of the system 600 of FIG. 6 according to one embodiment for enabling a receiver, e.g. a bicycle system, to remotely automatically identify a configurable vehicle, e.g. a bicycle 10, comprising a plurality of component devices, each of which transmits data to be received by the receiver. As described herein, the plurality of component devices of the configurable vehicle comprises devices operative to generate and transmit data to the gateway device 122 as well as devices not operative to generate and transmit data to the gateway device 122. In one embodiment, the plurality of component devices of the configurable vehicle comprise static component devices and dynamic component devices, wherein static component devices are component devices which are less likely to be moved to a different configurable vehicle than dynamic component devices. In one embodiment, the static component devices comprise one or more of a derailleur, crank, power meter or seat post, and the dynamic component devices comprise one or more of a tire pressure sensor, pedal power meter, battery or suspension mechanism. In one embodiment, the data transmitted by a component device comprises data identifying the component device and/or data indicative of the operation thereof. In one embodiment, the gateway device 606 (122) is in communication with at least the subset of component devices via a first network and in communication with the receiver via a second network different from the first network.

The operation of the system 600 includes: receiving, by the receiver 610 via a network from a gateway device operative to receive data from one or more of the plurality of component devices of the configurable vehicle and forward the received data to the receiver 610, data identifying at least a subset of the component devices (Block 702); accessing, by a vehicle identifier 612 coupled with the receiver, a database 614 coupled with the vehicle identifier 612 and comprising a plurality of data records, each of which is associated with a previously identified configurable vehicle and storing data identifying a set of component devices of which the associated previously identified configurable vehicle was comprised when it was identified (Block 704); comparing, by the vehicle identifier 612, at least a subset of the received data [threshold amount] with the stored data of one or more of the data records and generating a result based thereon (Block 706); and determining whether the received data is from a previously identified configurable vehicle based on the result of the comparing, wherein when the subset of the component devices identified by the received data matches a set of component devices identified by the stored data of a data record associated with a particular previously identified configurable vehicle, identifying the configurable vehicle from which the data was received as the particular previously identified configurable vehicle (Block 708).

In one embodiment, when the subset of the component devices identified by the received data matches at least a subset of a set of component devices identified by the stored data of a data record associated with a particular previously identified configurable vehicle, the operation of the system 600 may further includes identifying the configurable vehicle from which the data was received as the particular previously identified configurable vehicle (Block 710). In one embodiment, where the received data identifies component devices not identified in the data record, the operation of the system 600 further includes updating the data record to include data identifying those component devices identified by the received data but not present in the data record (Block 712). Where the received data does not identify component devices identified in the data record, it may be presumed they are defective, have a depleted battery, etc.

In one embodiment, when the subset of the component devices identified by the received data does not match at least a subset of a set of component devices identified by the stored data of a data record associated with a particular previously identified configurable vehicle, the operation of the system 600 further includes identifying the configurable vehicle from which the data was received as a newly identified configurable vehicle and creating a data record in the database in association therewith and storing the received data therein (Block 714).

In one embodiment the operation of the system 600 further includes, when the subset of the component devices identified by the received data matches a set of component devices identified by the stored data of a data record associated with the particular previously identified configurable vehicle, receiving, subsequent to the receipt of the data identifying at least a subset of the component devices, data associated with the operation of at least a subset of the identified subset of component devices (Block 716), and associating the received data associated with the operation of at least a subset of the identified subset of component devices with the data record associated with the particular previously identified configurable vehicle (Block 718). Data indicative of operation may include a sensed parameter, operational state, battery status, etc. and may be provided continuously, periodically or event driven.

Referring to FIG. 8, an illustrative embodiment of a general computer system 800 is shown. The computer system 800 can include a set of instructions that can be executed to cause the computer system 800 to perform any one or more of the methods or computer based functions disclosed herein. The computer system 800 may operate as a standalone device or may be connected, e.g., using an electronic communications network, to other computer systems or peripheral devices. Any of the components or modules discussed above, such as the processors 604 may be a computer system 800 or a component in the computer system 800. The computer system 800 may implement the computer implemented system 600 of FIG. 6.

In a networked deployment, the computer system 800 may operate in the capacity of a server or as a client user computer in a client-server user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection or cluster of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, specifically configured processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, solid state drive, compact disc ("CD"), digital video disc ("DVD"), memory card, memory stick, floppy disc, universal serial bus ("USB") memory device, or any other device operative to store data.

The memory 804 is operable to store instructions executable by the processor 802. The functions, acts or tasks illustrated in the figures or described herein may be performed by the programmed processor 802 executing the instructions 812 stored in the memory 804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806.

Additionally, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800.

In a particular embodiment, as depicted in FIG. 8, the computer system 800 may also include a disk or optical drive unit 806. The disk drive unit 806 may include a computer-readable medium 810 in which one or more sets of instructions 812, e.g. software, can be embedded. Further, the instructions 812 may embody one or more of the methods or logic as described herein. In a particular embodiment, the instructions 812 may reside completely, or at least partially, within the memory 804 and/or within the processor 802 during execution by the computer system 800. The memory 804 and the processor 802 also may include computer-readable media as discussed above.

The present disclosure contemplates a non-transitory computer-readable medium that includes instructions 812 or receives and executes instructions 812 responsive to a propagated signal, so that a device connected to a network 820 can communicate voice, video, audio, images or any other data over the network 820. Further, the instructions 812 may be transmitted or received over the network 820 via a communication interface 818. The communication interface 818 may be a part of the processor 802 or may be a separate component. The communication interface 818 may be created in software or may be a physical connection in hardware. The communication interface 818 is configured to connect with a network 820, external media, the display 814, or any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by an electronic communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., an electronic communication network. Examples of electronic communication networks include a local area network ("LAN") and a wide area network ("WAN"), e.g., the Internet.

A WAN can be a communications network or computer network that extends over a large geographical distance/place. WANs may be established with telecommunication circuits or other communicative circuits. WANs are an example of communication networks which may be used with bicycle systems, as are described further herein. Other communication networks may also be used. Also, various techniques may be used to facilitate communication through communication networks. For example, wired and/or wireless communication techniques may be used. In an embodiment, physical components of a bicycle communicate with the bicycle system using wireless communication techniques.

Specific WAN types, such as the Internet, or Web Service, may be system elements in a bicycle system. A Web Service or Internet type WAN may be a computing and/or communication service provided from one electronic device to another. Typically a Web Service or Internet type WAN consists of a web servers hardware running purpose-built software designed to interact with other computers or devices. The communication may be provided and/or otherwise facilitated using an application programming interface (API). An API is a set of functions and or other instructions allowing one computer application to access the features and/or data of an operating system, application, or other system.

The computing system can include clients and servers. A client and server are generally remote from each other and typically interact through an electronic communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for enabling a receiver to remotely automatically identify a configurable vehicle comprising:
    receiving, by the receiver via a network from an aggregating gateway device operative to receive and collect data from one or more of a plurality of component devices, each of which transmits data to be received by the receiver, of the configurable vehicle and forward the received data to the receiver, data identifying at least a subset of the component devices, wherein the aggregating gateway device is an aggregating component device;
    accessing, by a vehicle identifier coupled with the receiver, a database coupled with the vehicle identifier and comprising a plurality of data records, each of which is associated with a previously identified configurable vehicle and storing data identifying a set of component devices of which the associated previously identified configurable vehicle was comprised when it was identified;
    comparing, by the vehicle identifier, at least a subset of the received data with the stored data of one or more of the data records and generating a result based thereon;
    determining whether the received data is from a previously identified configurable vehicle based on the result of the comparing, wherein when the subset of the component devices identified by the received data matches a set of component devices identified by the stored data of a data record associated with a particular previously identified configurable vehicle, identifying the configurable vehicle from which the data was received as the particular previously identified configurable vehicle; and
    creating a data record in the database associating the received data with a new configurable vehicle when no match is determined.

2. The method of claim 1 wherein the configurable vehicle comprises a bicycle.

3. The method of claim 1, wherein the aggregating component device is a rear derailleur.

4. The method of claim 1 wherein the plurality of component devices of the configurable vehicle comprise static component devices and dynamic component devices, wherein static component devices are component devices which are less likely to be moved to a different configurable vehicle than dynamic component devices.

5. The method of claim 4 wherein the static component devices comprise one or more of a derailleur, crank, power meter or seat post, and the dynamic component devices comprise one or more of a tire pressure sensor, pedal power meter, battery or suspension mechanism.

6. The method of claim 4 wherein the comparing further comprises comparing the subset of the received data identifying only static component devices with the stored data of one or more of the data records and generating a result based thereon.

7. The method of claim 1 wherein the data transmitted by a component device comprises data identifying the component device and/or data indicative of the operation thereof.

8. A system for remotely automatically identifying a configurable vehicle comprising:
    an aggregating gateway device configured to receive and collect data from one or more of a plurality of component devices, each of which transmits data, of the configurable vehicle and forward the received data to a receiver, data identifying at least a subset of the component devices, the aggregating gateway device further configured to communicate the data with an external computer operable to communicate with a network, wherein the aggregating gateway device is an aggregating component device;
    a data receiver configured to receive, via the network from the aggregating gateway device, the data;
    a vehicle identifier coupled with the data receiver and configured to access a database coupled therewith and comprising a plurality of data records, each of which is associated with a previously identified configurable vehicle and storing data identifying a set of component devices of which the associated previously identified configurable vehicle was comprised when it was identified, the vehicle identifier is configured to:
    compare at least a subset of the received data with the stored data of one or more of the data records and generating a result based thereon;
    determine whether the received data is from a previously identified configurable vehicle based on the result of the comparison, wherein when the subset of the component devices identified by the received data matches a set of component devices identified by the stored data of a data record associated with a particular previously identified configurable vehicle, the configurable vehicle from which the data was received is identified as the particular previously identified configurable vehicle; and
    identify the configurable vehicle from which the data was received as a newly identified configurable vehicle when the subset of the component devices identified by the received data does not match at least a subset of a set of component devices identified by the stored data of a data record associated with a particular previously identified configurable vehicle.

9. The system of claim 8 wherein the configurable vehicle comprises a bicycle, the external computer is a mobile device, and the aggregating gateway device is a derailleur configured to communicate data through the network using a mobile device.

10. The system of claim 8 wherein the plurality of component devices of the configurable vehicle comprises devices operative to generate and transmit data to the aggregating gateway and devices not operative to generate and transmit data to the aggregating gateway.

11. The system of claim 8 wherein the plurality of component devices of the configurable vehicle comprise static component devices and dynamic component devices, wherein static component devices are component devices which are less likely to be moved to a different configurable vehicle than dynamic component devices.

12. The system of claim 11 wherein the static component devices comprise one or more of a derailleur, crank, power meter or seat post, and the dynamic component devices comprise one or more of a tire pressure sensor, pedal power meter, battery or suspension mechanism.

13. The system of claim 11 wherein the vehicle identifier is further configured to compare the subset of the received data identifying only static component devices with the stored data of one or more of the data records and generating a result based thereon.

14. The system of claim 8 wherein the data transmitted by a component device comprises data identifying the component device and/or data indicative of the operation thereof.

15. The system of claim 8 wherein the aggregating gateway is in communication with at least the subset of component devices via a first network and in communication with the receiver via a second network different from the first network.

16. The system of claim 8 wherein when the subset of the component devices identified by the received data matches at least a subset of a set of component devices identified by the stored data of a data record associated with a particular previously identified configurable vehicle, the vehicle identifier is further configured to identify the configurable vehicle from which the data was received as the particular previously identified configurable vehicle.

17. The system of claim 8 wherein the vehicle identifier is further configured to-create a data record in the database in association therewith and storing the received data therein.

18. The system of claim 8 further comprising, when the subset of the component devices identified by the received data matches a set of component devices identified by the stored data of a data record associated with the particular previously identified configurable vehicle, the data receiver is further configured to receive, subsequent to the receipt of the data identifying at least a subset of the component devices, data associated with the operation of at least a subset of the identified subset of component devices, and associate the received data associated with the operation of at least a subset of the identified subset of component devices with the data record associated with the particular previously identified configurable vehicle.

* * * * *